April 18, 1939. H. A. MUNGER 2,154,467
TRAILER
Filed March 4, 1938 2 Sheets-Sheet 1
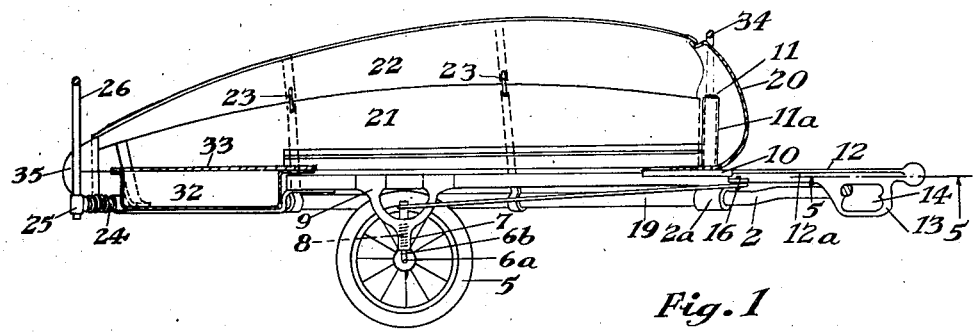
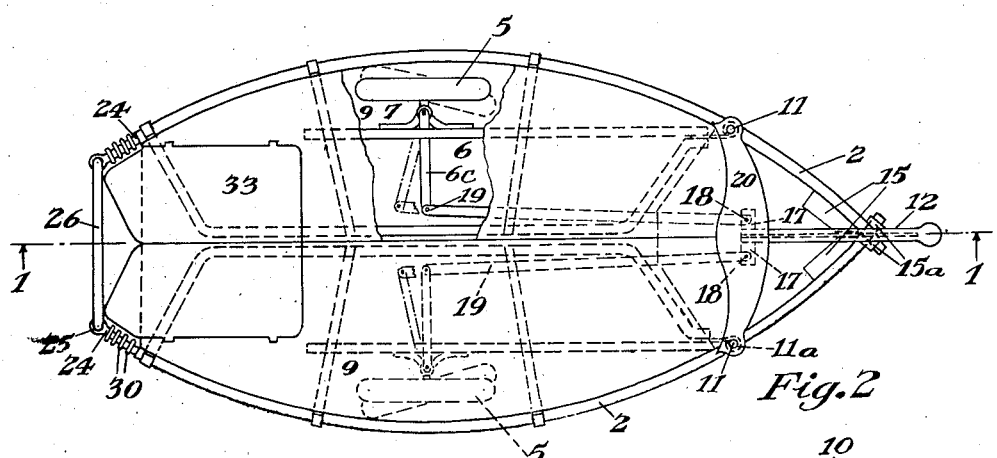
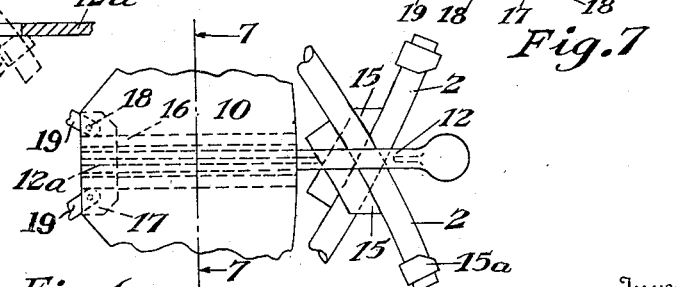
Inventor
HENRY A. MUNGER
By George C. Willcox
Attorney April 18, 1939.  H. A. MUNGER  2,154,467
TRAILER
Filed March 4, 1938    2 Sheets-Sheet 2

Inventor
HENRY A. MUNGER
By George C. Willcox
Attorney

Patented Apr. 18, 1939

2,154,467

UNITED STATES PATENT OFFICE 2,154,467

TRAILER

Henry A. Munger, Midland, Mich.

Application March 4, 1938, Serial No. 193,977

9 Claims. (Cl. 296—23)

This invention relates to camp trailers and has for its object the provision of a novel expansible trailer which shall be light in weight, inexpensive to build, and simple to open and close when setting up and breaking camp. My novel construction lends itself to the building of a trailer which is weather-tight and dust-proof when closed, and which is modern and attractive in appearance.

The invention consists broadly of a trailer divided longitudinally into releasably joined halves, each half having a wheel or wheels journaled and supported independently of the other. The wheels of each half are pivoted vertically for movement to divergent position, and are operably connected to the draw-bar of the trailer by novel means so that after releasing the halves force applied to the draw-bar diverges the wheels or restores them to parallelism, and a short movement of the trailer extends the halves or draws them together.

A further feature of the invention is a novel arrangement of the trailer frame assembly, whereby a large tent may be easily and quickly erected and supported upon the trailer and certain extensible members thereof, whereby a sheltered space much longer and wider than the normal area of the closed trailer is available.

Another advantageous feature of my new construction is that the trailer has a very low center of gravity as compared with the tent trailers of conventional construction. When the trailer is opened all of the enclosed ground space is unobstructed by any running gear or chassis elements and the beds are at convenient sitting height from the ground. Also, in contrast to earlier small camp trailers, beds are provided which may be kept made and need not be disturbed when opening or closing the trailer. An additional advantage incident to the lower center of gravity and the novel construction of the trailer is that it lends itself to safe and easily accessible stowage of camping equipment, and is adapted to carry a boat or canoe conveniently without imposing a top-heavy load upon the running gear.

Other novel features and advantages of the invention will be apparent in the course of the following specification. In the accompanying drawings, which show diagrammatically and specifically a trailer according to the invention—

Figure 3:
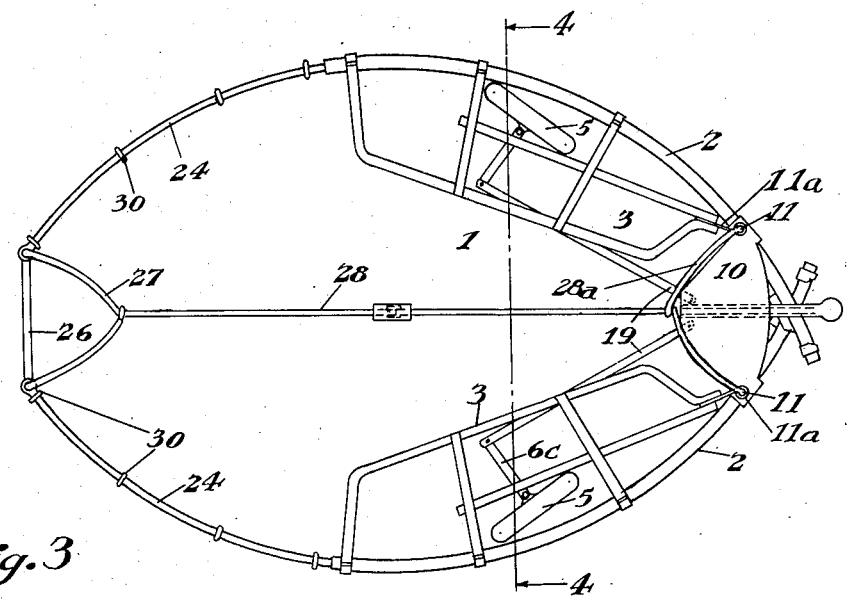
Figure 4:
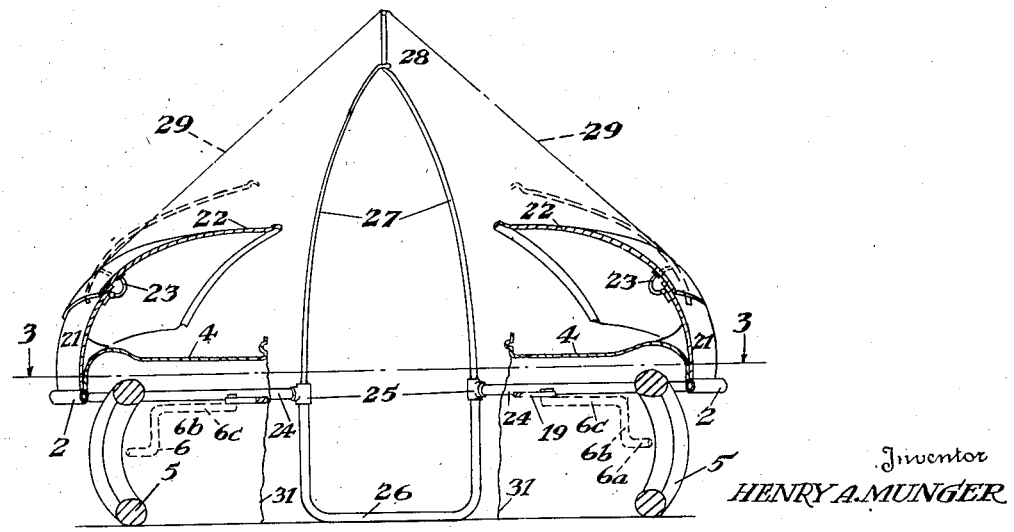

Fig. 1 is a cross-sectional side elevation of a trailer, taken along line 1—1 of Fig. 2, Fig. 2 is a top plan view, partly broken away, of the trailer of Fig. 1, with the cover elements removed, Fig. 3 is a diagrammatic top plan view of the framework of the trailer, showing it fully expanded and extended, with a tent ridge-pole erected thereon. The view is taken along lines 3—3 of Fig. 4, Fig. 4 is a vertical transverse section, taken along line 4—4 of Fig. 3 looking toward the rear of the trailer, which shows diagrammatically a mode of erecting and supporting a tent thereon, Fig. 5 is an enlarged fragmentary top-plan view, taken along line 5—5 of Fig. 1, of a novel arrangement of the side frame members and the draw-bar of the trailer, Fig. 6 is a fragmentary top plan view of the front end of the trailer, showing the arrangement of the draw-bar and its connection to the wheel-actuating linkage and the trailer frame, and Fig. 7 is a vertical section taken transversely along line 7—7 of Fig. 6.

The drawings illustrate a preferred embodiment of the invention, consisting of a compact, light-weight trailer having a two-wheel running gear.

The trailer shown consists of a chassis 1 divided longitudinally into halves which are separable laterally to expand the trailer and make available a clear ground and floor space between them.

The chassis 1 is a light-weight assembly comprising a pair of tubular side members 2, shown in this embodiment as curved laterally to provide a desirable streamlined appearance. A framework of metal straps or bars 3, arranged to support bunk floors 4, is fixed to each side member 2. The bunk floors 4 are shaped and formed to enclose the under side of the trailer when the halves are joined as in Fig. 2, and at their inner edges they are flanged and provided with co-operating tongue-and-groove portions, or other sealing and locking means, to provide a dust- and water-tight joint and mutual reinforcement of the closed halves. A wheel 5 is journaled beneath each half of the trailer assembly, each wheel and its mounting being independent of the other. Each wheel 5 is mounted for pivotal movement about a vertical axis, whereby they may be turned divergently out of their normal parallel relation. One mode of so mounting and journaling the wheels is illustrated diagrammatically in the drawings. Referring specially to Figs. 1, 2, and 4, a unitary axle and king pin 6 may be provided, consisting of a bar bent to provide a horizontal spindle 6a, a vertical portion 6b, and an inwardly extending horizontal lever arm 6c. The vertical king pin 6b of the axle is suitably journaled beneath the chassis, as for example, in a tubular housing 7 integral with a yoke 9 suitably riveted or welded to a chassis-frame member. A coil spring 8, indicated in dotted lines in Fig. 1, is fixed within the housing and is connected to the axle in load-supporting relation by appropriate known means of any desired kind.

The halves of the trailer are pivotally connected at their front ends by a common frame element consisting of or comprising a horizontal plate 10 (see Figs. 1 and 3). Each tubular side member 2 passes through one arm of a T-fitting 2a, the upright arm of which is pivotally secured to the lower end of a vertical spindle 11 passing through and fixed to plate 10. The spindles 11 are preferably tubular to present a pair of stanchions to receive a tent frame element hereinafter described. Plates or castings 11a fixed to the chassis frames 3 present sleeves journaled upon spindles 11.

The side members 2 extend forwardly of pivots 11 and overlap. At their intersection each member 2 is interlocked with a draw-bar 12. A novel operative relationship between the side members and the draw-bar is provided at this point, whereby endwise displacement of the draw-bar relative to the trailer locks and unlocks the separable trailer halves. Draw-bar 12 conveniently consists of a T-shaped member having a vertical web 12a. At its forward end the draw-bar is provided with a suitable hitch for attachment to the towing vehicle. The draw-bar is connected to plate 10, as shown in Fig. 7, so as to be displaceable endwise thereof. The horizontal flange of the draw-bar is retained against the under side of plate 10 by a pair of lug-shaped longitudinal plates 16 spaced apart laterally to permit endwise sliding movement of the draw-bar web between their spaced edges and of the draw-bar flange between their upper faces and plate 10. The vertical web 12a of the draw-bar has integral therewith or attached thereto a depending fin 13, which is provided with an aperture 14 consisting of two laterally merged longitudinal slots. Through the upper half of the opening 14 one side arm 2 of the trailer passes, while the other member 2 passes through the lower part of said opening in the opposite direction. The two side members 2 are offset vertically so that they cross without interference where they pass through aperture 14.

When the trailer is opened, as in Figs. 3 and 4, its halves are turned about their pivots 11 and the members 2 forward of the pivots move relatively to each other into the further overlapped relation shown. Each side member 2 then passes farther through the opening in the fin 13. To prevent this occurring accidentally while the trailer is being towed, each side member is provided with a locking abutment plate 15 welded thereto, as shown in Fig. 5. When the displaceable draw-bar is subjected to tension it is in its forward position, that is, to the right in Figs. 2 and 5. Under this condition abutment plates 15 and the side members 2 are positioned relative to the draw-bar as in solid lines in Fig. 5. Each abutment 15 has a mitered front edge which, when the draw-bar is pulled forward, abuts against the vertical fin 13. Since towing urges the draw-bar to the right, the engagement of web 15 with the fin 13 of the draw-bar prevents displacement of member 2 through opening 14, and no outward displacement of the side members 2 behind their pivot points can occur. When it is desired to unlock the trailer and expand the halves, rearward pressure (to the left in Fig. 2) is applied to the draw-bar 12. The draw-bar is displaced rearwardly relative to plate 10 and side members 2 far enough so that the abutment plates 15 can pass through the elongated opening 14. The side members 2 can then pivot relative to the nose plate 10 into the position shown in Fig. 3, with their forward ends displaced past each other through the opening in the draw-bar into the position shown on a larger scale in Fig. 6.

Draw-bar 12 is operatively connected to wheels 5, so that upon endwise displacement it pivots the said wheels oppositely about their vertical axes to or from the divergent position 5 indicated by dotted lines in Fig. 2. Near its inner end the vertical web 12a of the draw-bar carries a pair of angle brackets 17 provided with pivot holes, each of which is connected by a pin 18 to a link 19 (see Figs. 6 and 7). The opposite ends of links 19 are each pivoted to the extremities of horizontal lever arms 6c of the wheel axles 6.

Rearward displacement of the draw-bar as described above not only unlocks the halves of the chassis by permitting relative displacement of side members past each other and through opening 14, but also produces a rearward thrust upon connecting rods 19 to turn lever arms 6c about their pivot points, as indicated by the dotted lines in Fig. 2.

To open the trailer the draw-bar 12 is thrust and shifted rearwardly, pivoting the wheels to their divergent positions. The length of the mitered abutment edges of stops 15 is such that the wheels are fully divergent before the stops disengage the fin 13 of the draw-bar to pass through the aperture 14. The halves of the trailer are thus positively prevented from spreading until the wheels reach their maximum divergence. The draw-bar 12 reaches the rearward limit of its travel relative to the trailer, and engages suitable stop means. The backing thrust upon the draw-bar then moves the trailer to the rear, and wheels 5 draw their respective halves apart to their fully open position, as shown in Fig. 3. When the trailer is fully open, its further expansion is arrested by engagement of the lateral edges of stops 15 against the edge of fin 13 at the rear of aperture 14. Additional stops of any desired form may of course be provided to limit the opening travel of the halves of the trailer.

When the trailer is to be closed for traveling, the abutment plates 15 and fin 13 co-operate to maintain the angular relationship of the wheels until the halves are parallel and urged together. To close the halves, the trailer is drawn forward by draw-bar 12. The stop plates 15 extend through aperture 14, and their lateral edges engage fin 13 at the rear of the draw-bar until they have been completely withdrawn from the opening. Stops 15 are so located on side members 2 and their lateral edges are of such a length that they slip from the aperture and disengage the fin 13 only when the trailer halves are firmly together. The fin 13 and draw-bar 12 are then free to move forward, restoring the wheels to parallelism. The wheels 5 are thus held from castering toward their normal position, while the trailer is being closed, insuring a firm complete engagement of the halves during a forward travel no longer than the backing movement necessary to extend them to fully open position.

Suitable covers are provided upon the chassis described. A preferred novel housing assembly is shown in the drawings. Upon each half of the trailer a side wall portion 21 is fixedly mounted, along the top edge of which a movable cover piece 22 is secured by hinges 23 for raising toward an upright position, as indicated in dotted lines in Fig. 4. In closed position the cover pieces 22 overlap along their upper edges at the center line of the trailer. This joint may be sealed by a sponge-rubber gasket strip or other suitable means. A fixed nosing 20 secured to or integral with plate 10 is mounted to enclose the front of the trailer. All of the cover elements may be stamped from sheet metal, or may be made of fabric stretched over light-weight framing.

When the trailer halves have been expanded to open position, as described above, a tent is erected upon the novel framework next described. Extension rods 24 project rearwardly of the side members 2 to support the eaves of a tent longer than the trailer proper. In the example shown in the drawings, the extension members 24 consist of tubes curved to the same radius as the tubular side members 2 of the trailer, and are smaller in diameter so as to telescope within said side members. T-fittings of the rear ends of members 24, 25 are provided to receive the ends of a U-shaped connecting member and support 26.

When the trailer is closed the U-member 26 is inserted in inverted position in the T-fittings 25 and serves to hold the rear portions of the trailer halves together. When the trailer is open and the extension side members 24 are withdrawn to their full extent the U-member 26 is reversed and reinserted in the T-fittings 25, in which position it locks the extension members 24 together laterally, and with its horizontal bar upon the ground supports the rear end of the trailer and tent frame in a level position. Set up in this way it also defines the threshold of the tent door.

A compact, easily erected tent framework is illustrated diagrammatically in Figs. 3 and 4. A collapsible wishbone-shaped support 27 is inserted in the T-fittings 25, the spread legs of 27 defining the upper part of the tent door. The upper end of the wishbone receives one end of a ridge pole 28, shown with a snap hinge at its center to permit folding for easy stowing. The opposite end of the ridge pole is similarly received in and supported by a second wishbone support 28a, inserted in stanchions 11 at the front of the trailer. A tent 29, indicated in broken lines in Fig. 4, is stretched over the collapsible ridge and is secured at or near the side members 2 by any desired means, such as snap fasteners, not shown. The hinged covers 22 may be raised to any desired height and latched there by means not shown, so that they spread and support the hips of the tent 29.

The eaves of the tent rearwardly of the trailer proper are fastened along the extension members 24, as by sliding rings 30. The skirt or wall of the tent may hang from side members 2 and 24 entirely around the trailer, or the wall of the tent may extend only along members 24. In the latter case inner wall cloths 31 (see Fig. 2) are attached to the inner edges and ends of the bunk, terminating at each side of the tent. The latter wall cloths remain dry in bad weather, and when the trailer is to be closed they can be turned up over the mattresses and bedding on the bunks 4 to protect them if a wet tent must be stowed away.

If the trailer is made sufficiently long over-all, storage space is afforded at the rear end of each bunk. A pair of dust-proof bins or compartments 32 are provided, covered by hinged sheet-metal lids 33.

When the trailer is closed for travel, as in Figs. 1 and 2, a second U-shaped member 34 may be inserted in stanchions 11, the horizontal bar of member 34 forming a convenient support for one end of a boat or canoe, the other end being supported upon the U-frame 26.

Use and operation of the trailer described is very simple and convenient. The trailer is maneuvered in front of the desired camp site, the U-frame 26 is removed from fittings 25, and any additional latches or locking devices for securing the trailer halves together are released. The tail piece 35 is removed and the hinged cover portions 22 are raised. The trailer is then backed onto the site. As this is done, the draw-bar 12 is displaced rearwardly, moving the rear portion of the depending fin 13 out of engagement with abutment plates 15 of the side members 2, unlocking the trailer halves and turning the wheels into their divergent positions (see Fig. 2). Continued movement of the trailer urges the two halves apart to their open position, as above described.

The extension side members 24 are then drawn out and U-member 26 is inverted and reinserted in the T-fittings 25 at the end of the rod. Wishbones 27 and 28a are inserted in fittings 25 and stanchions 11, as in Fig. 4. The tent 29 which has been stowed inside the covers in place over the ridge pole is then raised, and the ends of the ridge pole are fitted into the wishbones. The edges of the tent are then pulled over the covers 21 and 22 and secured along side members 2 and 24. The hinged cover members 22 are then raised to their fullest extent and secured in place, providing head room over the beds and fully extending the tent. Wall cloths 31 are dropped and the bunks are then clear and ready for use.

When camp is broken, closing and covering the trailer is an easy reversal of the above described procedure.

When the trailer is being towed, the forward pull upon the draw-bar holds fin 13 between the abutment plates 15 on the side members, preventing separation of the two halves of the trailer, even though other locking means are omitted, or if insertion of U-member 26 in T-fittings 25 should be forgotten. The lever arms 6c of axle member 6 likewise are continually drawn forward, so that the wheels 5 are retained in parallel alinement.

While I have shown and described a trailer embodying my invention, its specific form is illustrative only, and various changes and modifications in its construction may be made without departing from its spirit or the scope of the appended claims. For example, the trailer may be built so that its halves are separated by drawing the trailer ahead, instead of backing onto the camp site as above described. In this case the wheels will be pivoted to diverge outwardly at their forward portions in response to forward displacement of the draw-bar. Instead of the co-operating fin 13 and abutments 15, positive locking means of any desired kind must be provided to insure against accidental diverging movements of the wheels while on the road. The trailer will be closed by backing it from the camp site, but in its essential construction and operation it will otherwise be the same as in the preferred embodiment above described.

The extension rails 24 for the side members of the trailer may also take various forms. In a low cost trailer they may simply be demountable bars which are carried along side members 2 when the trailer is closed, and which when extended, may be secured at their inner ends to the trailer in any desired way. Or if so much tent space is not needed, the extension members may be omitted entirely. For economical construction, also, it may be desired to use straight side bars, or other structural elements in place of the curved tubular members shown.

Many variations in the form of the tent supports and tent may also be made without departing from the invention. The trailer shown may be constructed for slightly greater expansion and extension to substantially circular form, instead of to the elliptical outline shown in Fig. 3. In this case a standard circular tent with a center pole may be erected, secured at its eaves over the sides of the trailer.

In applying the invention to a larger trailer than that shown, it may be desirable to provide a second pivoted wheel in tandem behind each wheel 5, linked to it for coincidental pivoting in response to displacement of the draw-bar. Other modifications of the mechanical elements shown may also be made, as in the springing of the wheels, in the mechanism for effecting their pivotal divergent movement, etc., within the scope of the appended claims.

Having thus described my invention, what I claim and desire to secure by Letters Patent is:

1. An expansible longitudinally divided trailer comprising two laterally separable halves, a wheel journaled beneath each half and pivotally mounted for turning out of alinement with the longitudinal axis of the trailer, a draw-bar mounted upon said trailer displaceable endwise relative thereto, and actuating means connecting said draw-bar to said pivotally mounted wheels operable in response to endwise displacement of said draw-bar to turn the wheels oppositely about their pivots to divergent positions, whereby rolling said trailer in one direction moves the halves apart into expanded position and rolling it in the opposite direction draws the halves together.

2. An expansible longitudinally divided trailer comprising two laterally separable halves, a wheel journaled beneath each half and pivotally mounted for turning out of alinement with the longitudinal axis of the trailer, a draw-bar mounted upon said trailer displaceable endwise relative thereto, and actuating means connecting said draw-bar to said pivotally mounted wheels operable in response to rearward displacement of said draw-bar to pivot said wheels oppositely to rearwardly divergent positions, whereby rearward propulsion of said trailer rolls its halves apart into expanded position.

3. A trailer as claimed in claim 2 having means on said trailer halves co-operating with said displaceable draw-bar, operable to hold said halves in closed position when the draw-bar is in its forward position, and releasable upon rearward displacement of said draw-bar to permit separation of the halves to expanded position.

4. In a trailer as claimed in claim 1 wherein the two trailer halves are pivotally secured adjacent their forward ends to a common frame member so mounted that expansion of the trailer is effected by pivoting of the halves about their forward ends into divergent position, and the draw-bar is displaceably connected to said frame member, in combination, a stop member fixedly mounted upon each trailer half ahead of its pivot point, and an abutment member on said draw-bar positioned and adapted for engagement with said stop members to prevent pivotal movement of their associated trailer halves when the draw-bar is in its normal towing position, and movable upon displacement of said draw-bar from said normal position out of engagement with said stop members to permit pivoting of the trailer halves into expanded position.

5. In a trailer as claimed in claim 1 wherein the trailer halves are pivoted adjacent their forward ends to a common frame member and the draw-bar is displaceably mounted upon said frame member, in combination abutment means fixedly mounted upon at least one of said trailer halves ahead of the pivot point thereof and a co-operative stop element upon said draw-bar, said abutment means being formed and positioned so that pivotal movement of its trailer half relative to said frame member and draw-bar during opening of the trailer moves it into position for engagement with the said stop element, whereby during closing of the trailer displacement of the draw-bar to its normal towing position and straightening of the wheels are prevented until the trailer halves have been brought together.

6. A trailer comprising longitudinal halves connected for lateral separation each containing a bunk or seat, independent wheels pivotally mounted beneath each half, and means for turning said wheels to divergent positions, so that rolling the trailer will separate the halves, whereby when the halves are opened unobstructed floor space is afforded between said bunks.

7. In a trailer longitudinally divided into halves, having means for separating said halves laterally, in combination, a rigid cover for each half, said covers meeting along the center-line of the closed trailer, said covers hinged horizontally at their outer edges to their respective trailer halves so that when said halves are separated they may be lifted to an elevated position, and a tent adapted for erection over the extended trailer, with its hips spread and supported by said covers and its eaves secured to the lateral edges of the trailer halves.

8. A trailer as claimed in claim 2, wherein locking means actuated by said draw-bar is provided, operable during rearward shifting of the draw-bar to prevent separation of the halves until the wheels have been pivoted to their fully divergent positions, and wherein means is provided operable when the expanded trailer is being closed to prevent forward displacement of said draw-bar and straightening of the wheels before the closing operation is completed.

9. In an expansible trailer divided longitudinally into halves pivotally connected at one end and having independent wheels beneath the halves whereby the halves are separable divergently from their pivotally connected ends, in combination, two extension side members formed and adapted to be carried along either side of the trailer when the trailer is closed, and adapted when the trailer is expanded to be fixed to and extend convergently rearwardly from the lateral edges of the trailer halves, and a U-shaped connecting member adapted to be detachably secured to the outer ends of said extension members to maintain them in laterally spaced relation to each other and to support them horizontally above the ground, whereby the lateral edges of said trailer halves and said extension members constitute a frame to spread and retain the eaves of a tent.

HENRY A. MUNGER.